United States Patent [19]

BEST AVAILABLE COPY

[11] 3,895,184

Komura et al.

[45] July 15, 1975

[54] FACSIMILE SYSTEM WITH BUFFERED TRANSMISSION AND RECEPTION

[75] Inventors: Yasuyuki Komura, Kawasaki; Takashi Fukushima, Yokohama, both of Japan

[73] Assignee: Ricoh Co., Ltd., Tokyo, Japan

[22] Filed: Aug. 6, 1973

[21] Appl. No.: 385,862

[30] Foreign Application Priority Data

Aug. 5, 1972 Japan ............................... 47-78609

[52] U.S. Cl. .................. 178/6; 178/DIG. 3; 360/51

[51] Int. Cl. ............................................ H04n 7/12

[58] Field of Search.................... 178/6, 6.8, DIG. 3; 179/15.55; 360/51

[56] References Cited

UNITED STATES PATENTS

| | | | |
|---|---|---|---|
| 3,480,931 | 11/1969 | Geissler | 360/51 |
| 3,521,241 | 7/1970 | Rumble | 178/DIG. 3 |
| 3,714,377 | 1/1973 | Moretti | 178/DIG. 3 |
| 3,784,737 | 1/1974 | Waehner | 178/DIG. 3 |
| 3,801,737 | 4/1974 | Komura | 178/DIG. 3 |

*Primary Examiner*—Howard W. Britton
*Attorney, Agent, or Firm*—Cooper, Dunham, Clark, Griffin & Moran

[57] ABSTRACT

A subject copy is scanned to derive facsimile or video signals at a scanning speed which is independent of the transmission speed, and the video signals of adjacent scanning lines are compared bit by bit with each other so that the video signals may be further coded and compressed. Then, the coded and compressed signals are temporarily stored into a storage device through a buffer memory, and the coded and compressed signals read from the storage device through the buffer memory are transmitted. In a facsimile receiver, the received coded and compressed signals are stored into a storage device through a buffer memory, and the coded and compressed signals read from the storage device through the buffer memory are decoded and applied to a recorder which scans at a scanning speed which is independent of the encoder transmission speed. When the buffer capacity is about to be exceeded, a control signal is generated which causes the encoder (in the transmitter) or the decoder (in the receiver) to act as though the following scanline is identical to the last one. Thus, scanning or reproducing resolution may be reduced in exceptional cases, but the buffering cost is maintained low and the overall system efficiency is high.

11 Claims, 13 Drawing Figures

FACSIMILE SYSTEM WITH BUFFERED TRANSMISSION AND RECEPTION

BACKGROUND AND SUMMARY OF THE INVENTION:

The present invention relates to an improvement of a facsimile system, and more particularly a facsimile transmission system in which the scanning speed of a scanner and a recorder may be arbitrarily selected independently of a data transmission speed and the data transmission band may be remarkably reduced.

In the conventional facsimile system, a subject copy to be transmitted is scanned at a constant scanning speed to derive electrical signals which are modulated and transmitted through a transmission channel, and the received facsimile signals are demodulated so that the subject copy may be reproduced by a recorder which scans at the same scanning speed as the scanning speed of the facsimile transmitter. Therefore the scanning speed is completely dependent upon the transmission speed. When a telephone line of 2,400 bands is used, it takes about 6 to 10 minutes to scan a subject copy of the size A4 (210 × 297 mm) with a resolution of 3 lines/mm.

In order to increase the scanning speed, there has been proposed a system in which a subject copy is scanned at a high speed, the electrical signals thus obtained are recorded upon a magnetic tape, and the facsimile signals recorded on the magnetic tape are read out and transmitted through a high speed transmission channel. There has been proposed another system in which the electrical signals obtained by scanning a subject copy are converted into digital coded signals and stored in a buffer memory and a scanner, a transmitter or receiver is started or stopped depending upon the quantity of data stored in the buffer memory. The disadvantages of the former method are low transmission efficiency and the need to interrupt transmission even when a momentary breakdown of a tape transport mechanism of a magnetic tape storage device occurs. The disadvantage of the latter system is that the system is complicated in construction and involves starting and stopping time intervals which affect adversely the total transmission time.

In view of the above one of the objects of the present invention is to provide an improved facsimile system.

Another object of the present invention is to provide a facsimile system which may arbitrarily selects the scanning speed independently of the transmission speed.

A further object of the invention is to provide a facsimile system in which both scanners in a facsimile transmitter and facsimile receiver may continuously scan at a constant scanning speed.

A further object of the present invention is to provide a facsimile system in which the data may be continuously transmitted at a constant speed without any interruption from a facsimile transmitter to a facsimile receiver.

A further object of the present invention is to provide a facsimile system which may effectively reduce the rebundancy of the facsimile signals.

According to one aspect of the present invention, the video signals obtained by scanning at high speed of one scanning line are compared bit by bit or elementary area by elementary area with the facsimile or video signals of the preceding scanning line to derive the conventional delta signals. The delta signals are further coded and compressed. The coded and compressed data signals thus obtained are stored into a storage device such as a magnetic tape storage device through a buffer memory, and the coded and compressed signals read from the storage device through the buffer memory are transmitted through a transmission channel. In like manner, the received coded and compressed signals are stored in a storage device through a buffer memory, and the coded and compressed signals read from the storage device through the buffer memory are transferred to a decoder where they are decoded into video signals. According to the present invention the scanning speed of the facsimile system may be arbitrarily selected independently of the transmission speed, and the equipment may be continuously operated.

According to another aspect of the present invention the quantity of data stored in a buffer memory is in excess of a predetermined level, the video signals of the next scanning line (and, if necessary, of the succeeding scanning lines) are regarded as being completely identical with those of the preceding scanning line. As a result it is not required to increase the capacity of the buffer memory, and the effective coding and compression of the video signals may be accomplished.

The above and other objects, features and advantages of the present invention will become more apparent from the following description of one preferred embodiment thereof taken in conjunction with the accompanying drawing.

DESCRIPTION OF THE PREFERRED EMBODIMENT

Figure 1:
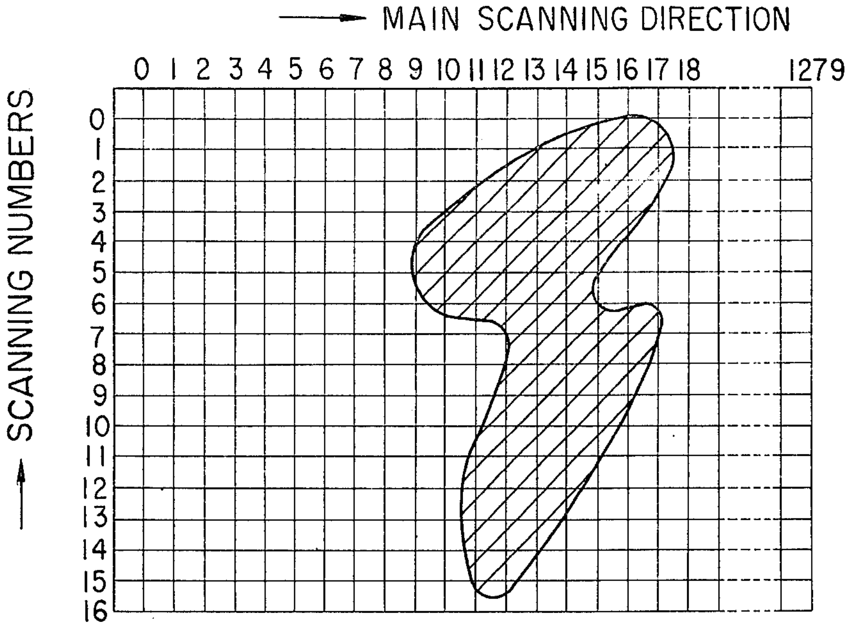
FIG. 1 shows a subject copy divided into 16 × 1280 elementary areas.
Figure 3:
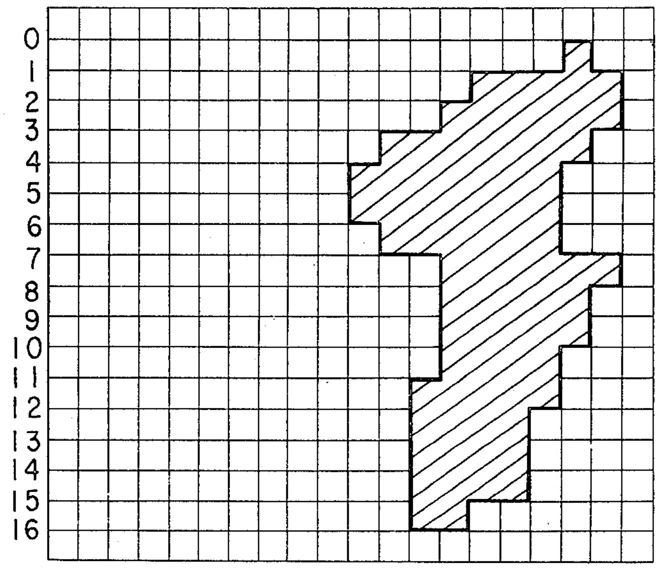
FIG. 3 shows the reproduction of the subject copy reproduced from the video signals shown in FIG. 2.
Figure 2:
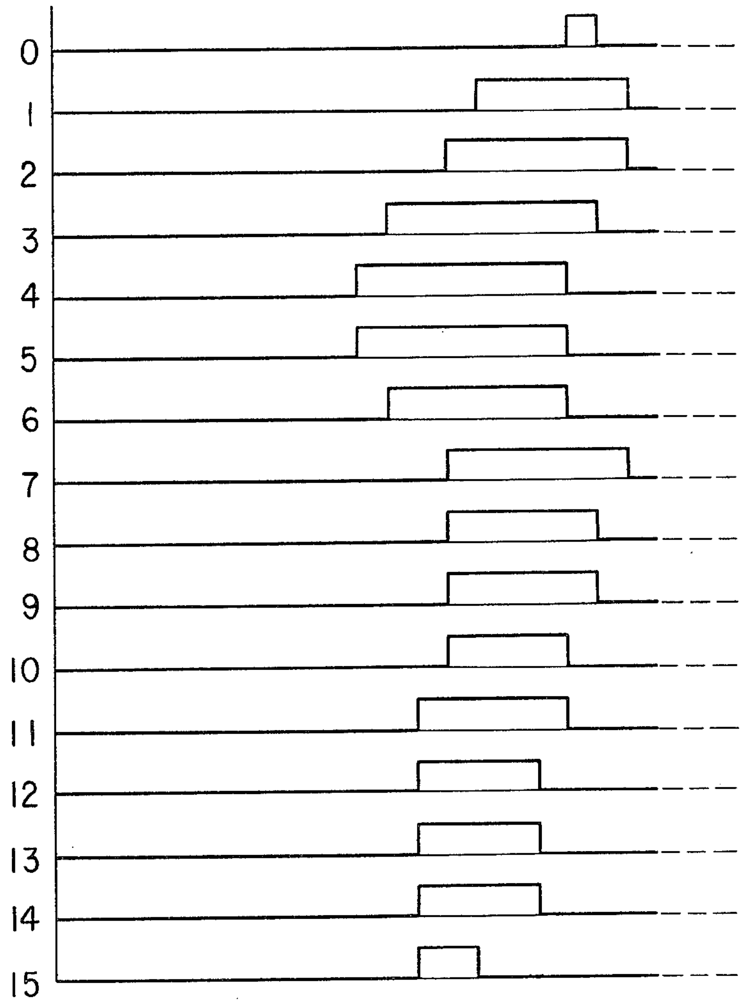
FIG. 2 shows the facsimile or video signals obtained by scanning the subject copy shown in FIG. 1.
Figure 4:
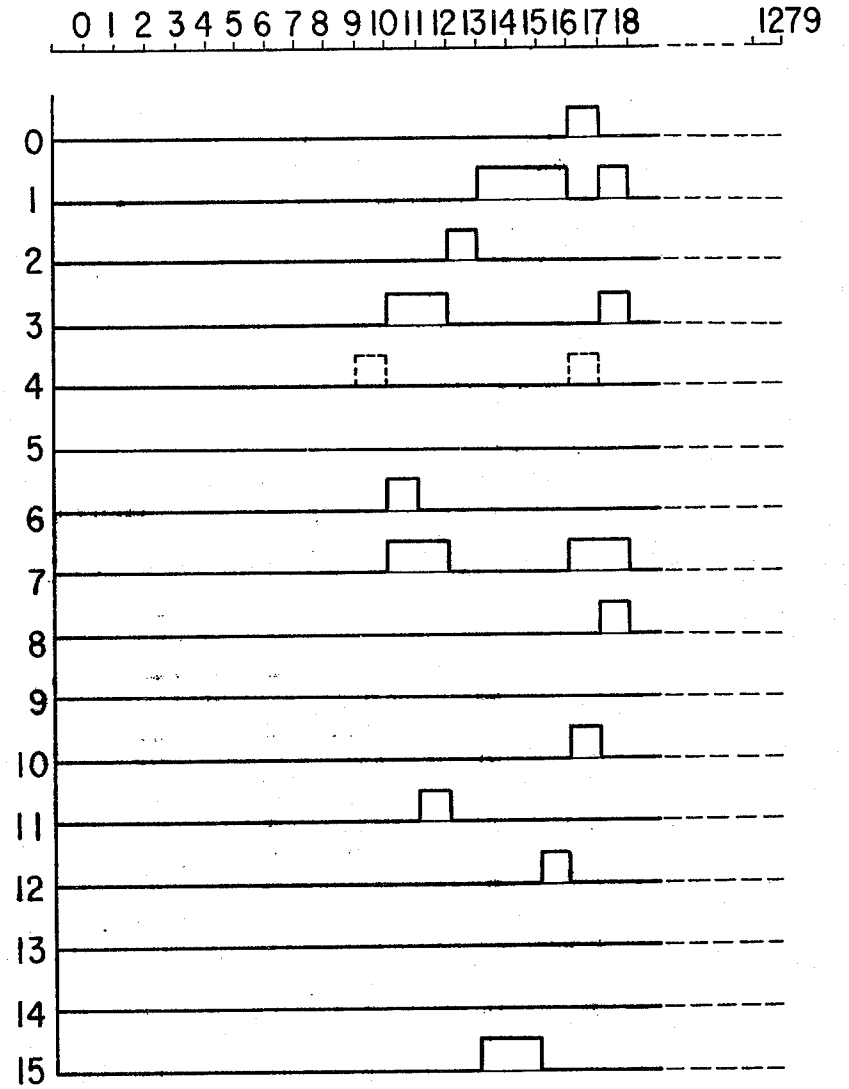
FIG. 4 shows delta signals derived from the video signals shown in FIG. 2.
Figure 5:
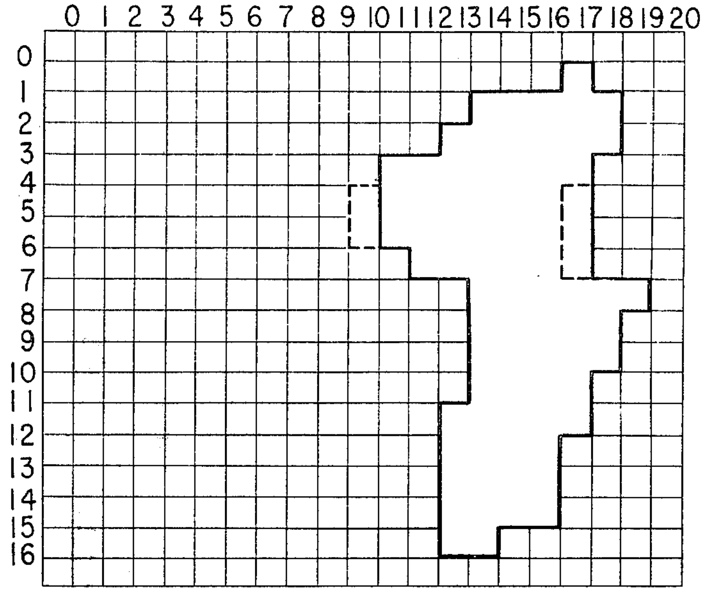
FIG. 5 shows the reproduction of the subject copy reproduced from the delta signals shown in FIG. 4.
Figure 6:
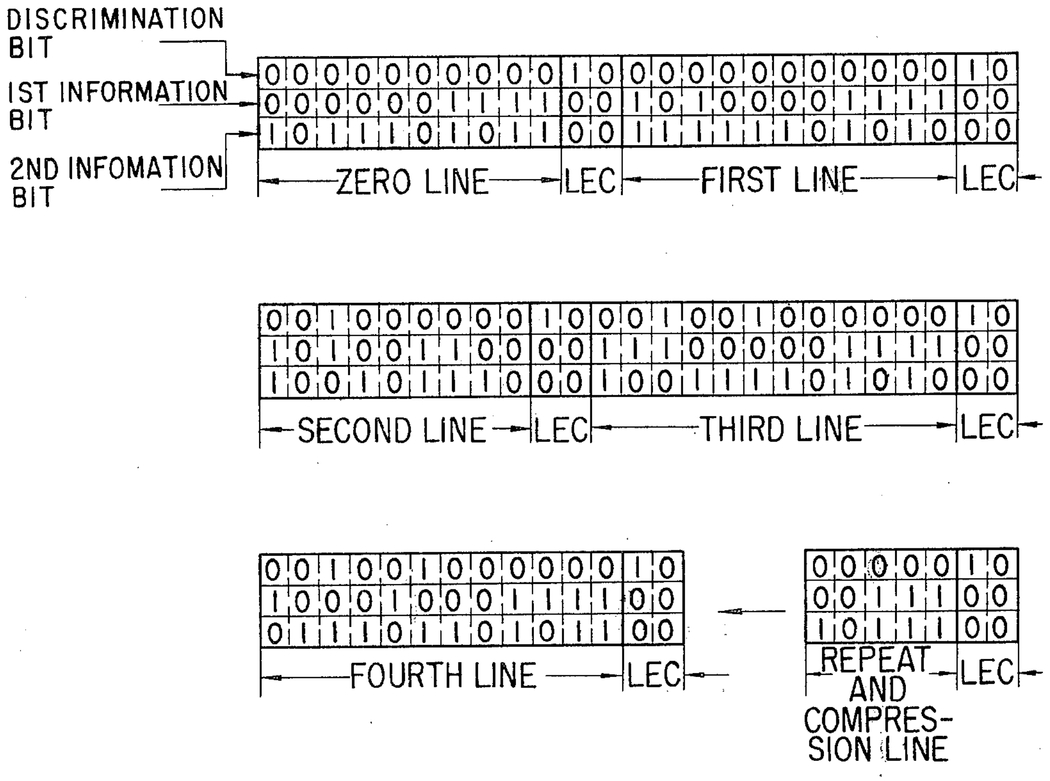
FIG. 6 shows one example of the coded and compressed signals of the delta signals shown in FIG. 4.

Referring to FIG. 1, a subject copy is divided into 16 × 1280 elementary areas, and the black areas are represented by the signals "1" whereas the white areas, by the signals "0" so that facsimile or video signals as shown in FIG. 2 are obtained. From these video signals the subject copy may be reproduced as shown in FIG. 3. The video signals shown in FIG. 2 are compared one scanning line by one scanning line and one elementary area by one elementary area in such a way that when the video signal representing an elementary area coincides with the video signal representing the corresponding elementary area of the preceding scanning line it is represented by 0 but when it does not coincide it is represented by 1. Therefore the so-called delta signals as shown in FIG. 4 are obtained. The pulse signals on the scanning line 4 indicated by the dot lines will be explained hereinafter. FIG. 5 shows the image reproduced from the delta signals shown in FIG. 4. The image reproduced is partly different from the image shown in FIG. 3 in the areas indicated by the dotted lines. The reason will be described hereinafter. The run-lengths of the delta signals shown in FIG. 4 can be coded in the form of three parallel bits as shown in FIG. 6. (Only the coded signals of the five scanning lines from the 0th to 4th scanning lines are shown). The first bit is a discrimination bit representing the coincidence signal 0 or the non-coincidence signal 1, and the second and third bits represent the run length of 0 or 1 coincidence or non-coincidence signal. For example, the following group of codes A

| | |
|---|---|
| discrimination bit: | . . . . 0 0 0 1 . . . . |
| 1st information bit: | . . . . 0 0 0 0 . . . . |
| 2nd information bit: | . . . . 1 0 1 1 . . . . |
| | \| ← A → \| |

represents that the run-length of the coincidence signals 0 is 17 bits (0 1 0 0 0 1) and then the non-coincidence signal with a run-length of 1 bit (0 1) follows. The codes in the block indicated by LEC represent the end of each scanning line. The codes in the block indicated by the "repeat and compression" scanning line will be described in more detail hereinafter.

Figure 7:
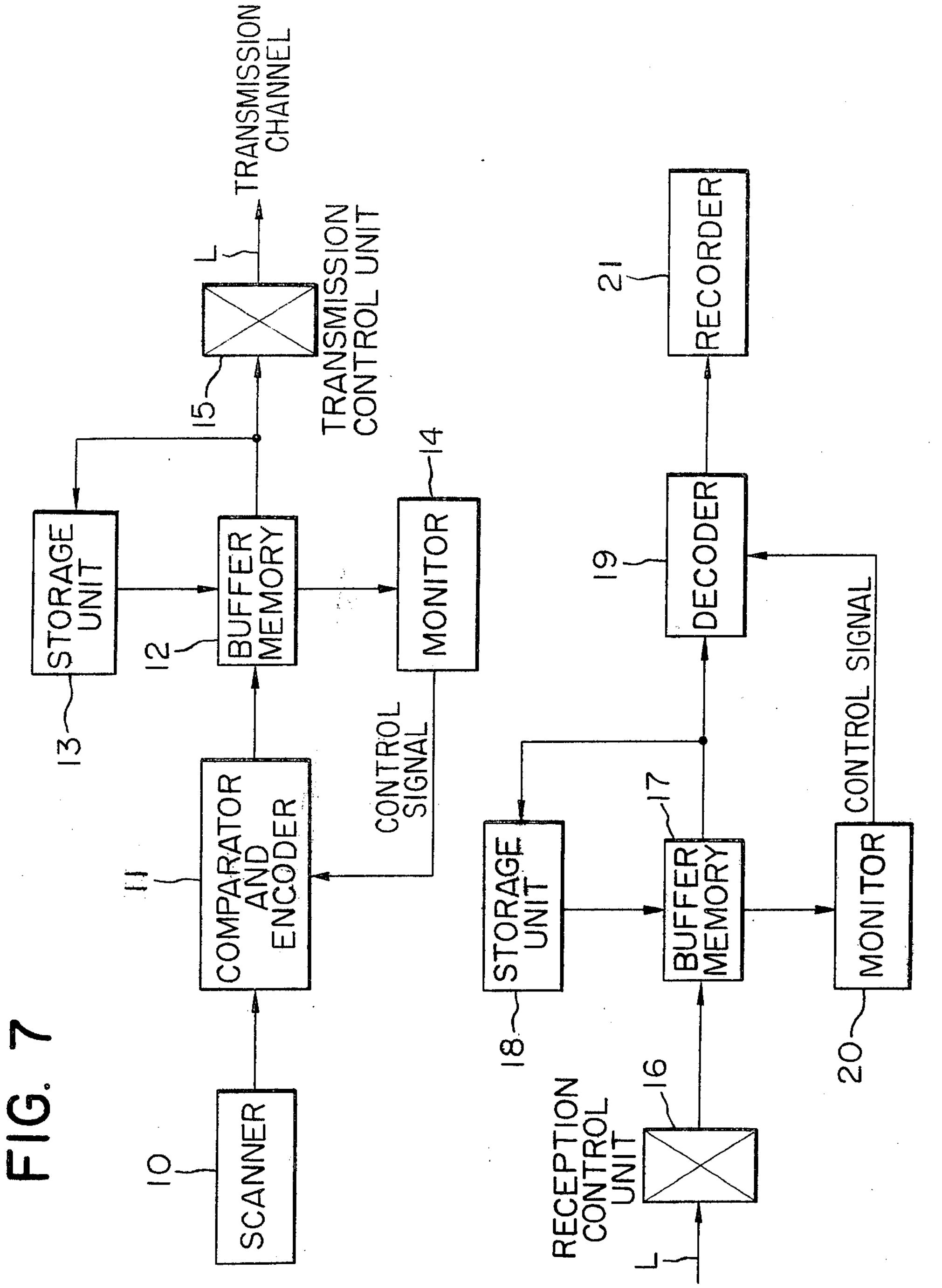
FIG. 7 is a block diagram of a facsimile system in accordance with the present invention.

Next referring to FIG. 7 illustrating the block diagram of the facsimile system in accordance with the present invention, a facsimile transmission equipment comprises a scanner 10, a comparator-encoder 11, a buffer memory 12, a magnetic tape recorder 13, a monitor 14, and a transmission control unit 15. A facsimile receiving station comprises a facsimile signal reception control unit 16, a buffer memory 17, a magnetic tape recorder 18, a decoder 19, a monitor 20 and a recorder 21.

The subject copy (FIG. 1) is scanned at a predetermined scanning speed by the scanner 10 and the video signals (FIG. 2) are fed into the comparator-encoder 11 so that the delta signals (FIG. 4) and then the coded and compressed signals (FIG. 6) are derived. The coded signals are fed into the buffer memory 12, transferred to and stored in the magnetic tape storage device 13, transferred back to the buffer memory 12 and then to the transmission control unit 15 from which the coded signals are transmitted through a transmission channel L. The scanning speed of the scanner 10 is independent of the transmission speed. Thus, transmission interruptions due to the momentary breakdowns of the scanner 10, the magnetic tape storage device 13 and so on may be avoided because the transfer of the coded signals to the magnetic tape storage device 13 as well as the transfer from the magnetic tape storage device 13 to the transmission control unit 15 are made through the buffer memory 12.

In like manner the coded signals received are stored in the magnetic tape memory 18 through the buffer memory 17 and then transferred to the decoder 19 through the buffer memory 17. The coded signals are decoded by the decoder 19 into the video signals which are fed into the recorder 21 for reproduction. In the facsimile receiving equipment the scanning speed of the recorder 21 is selected independently of the transmission speed, and the data flow in the receiving equipment is not interrupted as in the case of the transmission equipment.

Depending upon the type of a subject copy to be transmitted, the coded signals may sometimes exceed the capacity of the buffer memory 12 so that normal data transmission is prevented. This problem may be solved in a simple manner by increasing the capacity of the buffer memory 12, but this method is not economical because it is very rare in case of ordinary subject copies that the coded signals become in excess of the capacity of the buffer memory 12. Therefore according to the present invention the monitor 14 is provided in order to check the coded signals transferred into the buffer memory 12. Immediately before the buffer memory 12 overflows, a control signal is transmitted from the monitor 14 to the comparator-encoder 11 so that the video signals of the scanning line to be processed may be regarded as being completely coincident with the video signals of the preceding scanning lines. As a result the number of bits of the coded signals to be transferred into the buffer memory 12 may be reduced so that overflow may be prevented. This operation is referred to as the repeat and compression operation in this specification.

By this repeat and compression operation two pulses of the 4th scanning line are erased as shown by the dotted lines in FIG. 4, and the coded signals of the fourth scanning line can be further compressed as shown in the repeat and compression block in FIG. 6. The effect of this repeat and compression operation upon the reproduced image is the deviation or distortion from the original image indicated by the elementary areas indicated by the dotted lines in FIG. 5. This repeat and compression operation is based upon the observed fact that the video signals of not only the adjacent scanning lines but also of the scanning lines spaced apart by a few scanning lines are very similar. Therefore even if the resolution in the direction of the auxiliary scanning is reduced to one half, the original or subject copy may be satisfactorily reproduced.

The monitor 20 in the facsimile receiving equipment also functions in a manner substantially similar to that of the monitor 14 described hereinbefore. That is, immediately before the overflow of the buffer 17 occurs, a control signal is applied from the monitor 20 to the decoder 19 so that the coded signals of the scanning line to be decoded may be regarded as being completely similar to those of the preceding scanning line and video signals similar to those of the preceding scanning line may be reproduced.

Figures 8, 8A:
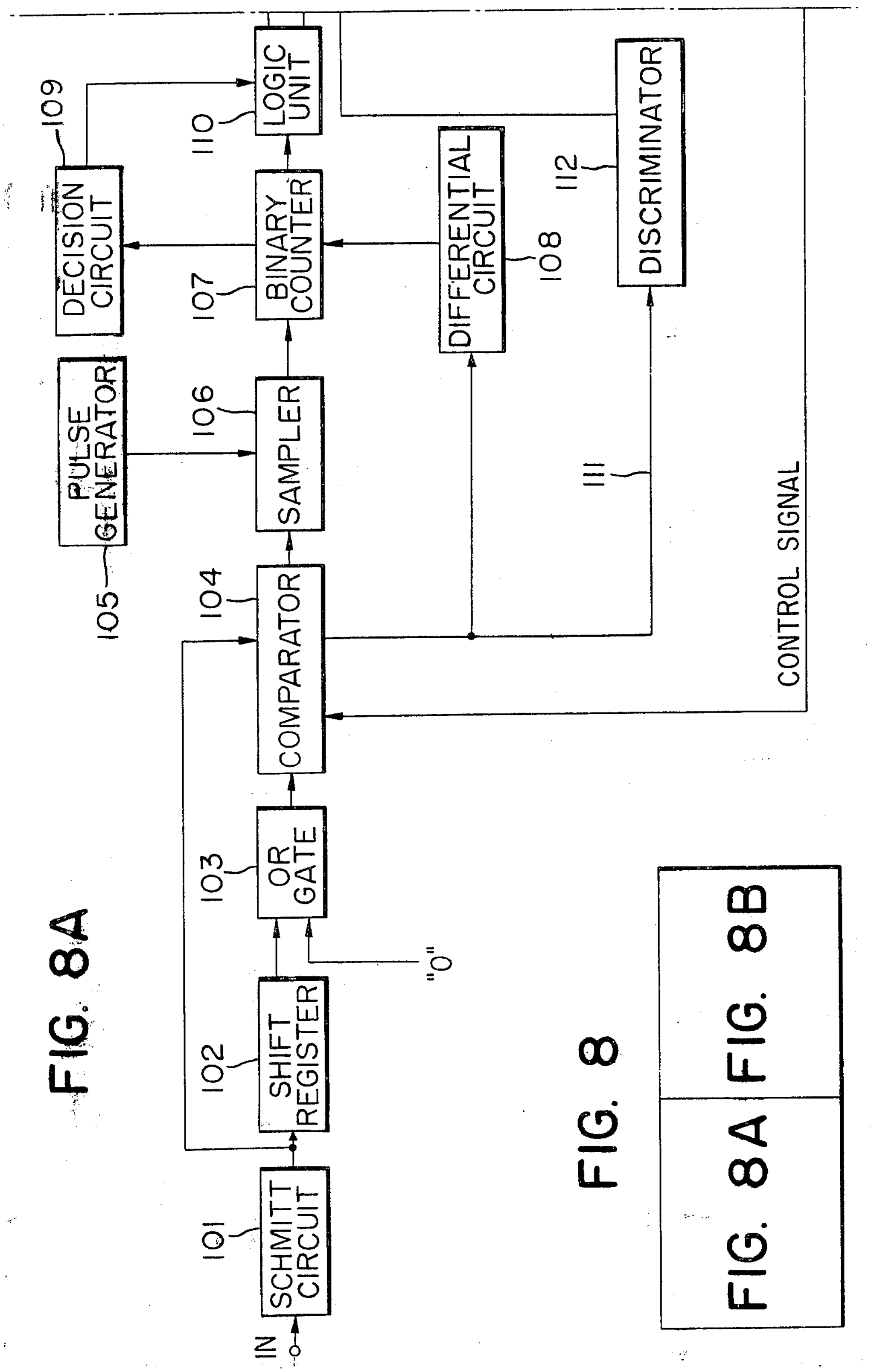
FIG. 8, including
FIGS. 8A and 8B, is a detailed block diagram of a facsimile transmitter thereof.
Figure 8B:
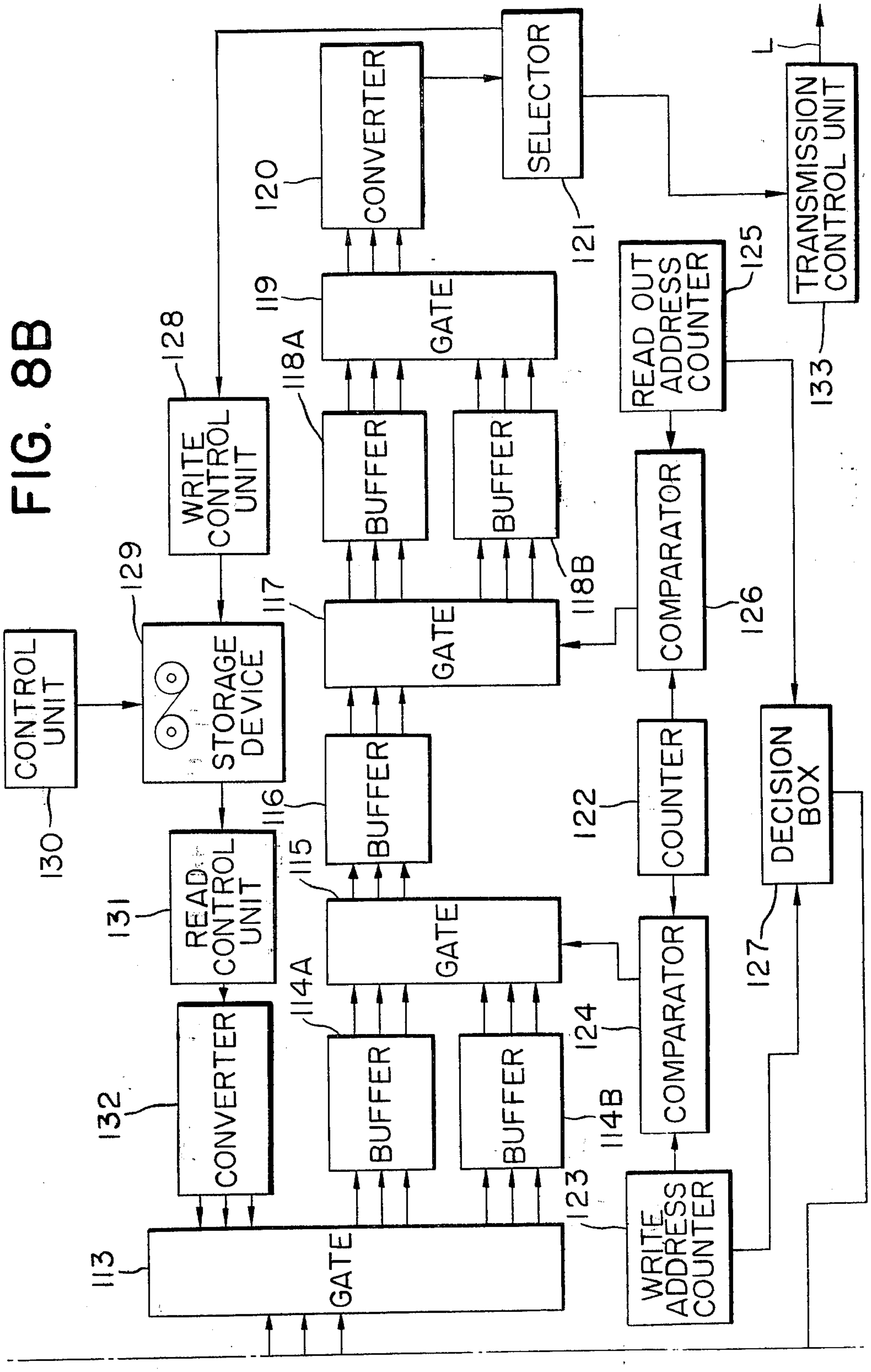

Next referring to FIG. 8, the facsimile transmission equipment will be described in more detail hereinafter. The video signals obtained by scanning a subject copy are fed into a Schmitt circuit 101 so that the video signals representing the black and white elementary areas are quantized into the signals 1 and 0, respectively. The quantized signals are fed not only into a shift register 102 but also into a comparator 104. The shift register 102 which has the capacity capable of storing therein the number of bits of one scanning line is used to store the quantized video signals of the preceding scanning line. The shift-to-right of the shift register 102 is synchronized with the scanning. The content of the shift register 102 is transferred through an OR gate 103 into the comparator 104 where it is compared with the quantized video signals of the next (new) scanning line directly supplied from the Schmitt circuit 101. When the scanning is started the signals 0's are applied to the OR gate 103 to have 0's stored in the comparator 104 so that all of the elementary areas of the first scanning line may be regarded as white. In the comparator the signals of the old or preceding and new or next scanning lines are compared bit by bit (or elementary area by elementary area) so that when the corresponding signals coincide with each other the comparator 104 gives the signal 0, but when they do not coincide, it gives the output signal 1. The comparator 104 may be for example an exclusive OR circuit. The delta signals thus obtained are fed into a sampling circuit 106 so that the delta signals may be sampled at a frequency of the clock pulses supplied from a pulse generator 105. The output pulses of the sampling circuit 106 are applied to a binary counter 107 so that the run-lengths of the coincident bits and non-coincident bits are counted. The point at which a series of coincident bits changes to a series of non-coincident bits or vice versa to be referred to as the "code change point" is detected by detecting the output of the comparator 104 by a differentiation circuit 108. The output of the differentiation circuit 108 is applied to the counter 107, and the output of the counter 107 is applied to a logic unit 110 where the serial-to-parallel conversion is effected. for example one group = 2 bits. The output of the logic unit 110 is transferred into a prestage or first buffer 114A or 114B through a first gate 113 which switches the transfer of the output the logic unit 110 to the first buffer 114A or 114B. The number of bits in each group is determined in response to the signal from a group bit number decision circuit 109. The output of the comparator 104 is also transmitted through a line 111 to a discrimination bit decision circuit 112 so that the coincidence and non-coincidence discrimination bits are formed and applied to the buffer 114A or 114B through the first gate 113. Thus the compressed coded signals as shown in FIG. 6 are obtained. The counter 107 is cleared in response to the output signal from the differentiation circuit 108 to start the counting of the next run-length.

The first buffers 114A and 114B are provided in order to ensure the operation of a buffer memory 116. For example when the output of the buffer 114A is transferred into the buffer memory 116, the output of the logic unit 110 is transferred through the gate 113 into the buffer 114B. The capacities of the buffers 114A and 114B are so selected that their operation may be carried out in synchronism with the buffer memory 116 even when the comparator 104 gives an output at the maximum frequency. The output of the buffer 114A or 114B is transferred into the buffer memory 116 through a gate 115 which switches the information transfer from the buffer 114A to the buffer 114B or vice versa. The buffer memory 116 comprises a dynamic register such as a delay line, and the change of address is monitored by a counter 122. The write address is indicated by a counter 123. The outputs of the counters 122 and 123 are compared by a second comparator 124 so that when they coincide with each other the gate 115 is actuated to transfer the content of the buffer 114A or 114B into the address of the buffer memory 116 selected by the counter 123. In like manner the address to be read out is selected by a counter 125, and when the content of the counter 125 coincides with that of the counter 125, a gate circuit 117 is actuated in response to the output of a comparator 126 so that the content stored in the address selected by the counter 125 of the buffer memory 116 is transferred into a second buffer 118A or 118B, which is similar to the first buffers 114A and 114B. The contents of the buffer 118A and 118B are alternately transferred into a parallel-serial conversion circuit 120 through a gate circuit 119, and the serial coded signals are sequentially stored in a magnetic tape storage device 129 through a decision box 121 and a write control unit 128.

In general the contents of the write address counter 123 and read address counter 125 are not so different from each other, but depending upon the content of a subject copy to be transmitted overflow of the buffer memory 116 may occur because of an increase of the coded signals to be applied to the buffer memory 116. A decision box 127 is always monitoring the contents of the counters 123 and 125 so that when the difference between the contents thereof is in excess of a predetermined value, the decision box 127 gives a control signal to the comparator 104. Then the comparator 104 does not compare the quantized video signals of the old and new scanning lines, but gives only the coincidence signals 0's. Therefore the coded signals may be reduced in number as described hereinbefore with reference to FIG. 7.

When the data of one subject copy are stored in the magnetic tape storage 129, a control signal is applied thereto from a control unit 130, so that rewinding at high speed may be effected. Upon completion of the rewinding, the data is transferred into a serial-parallel converter 132 through a read control unit 131 so that the data are converted into the form of 3-bit parallel signals. The output of the serial-parallel converter 132 is transferred into the buffer memory 116 through the gate 113, the first buffer 114A or 114B, and the gate 115. The output of the buffer memory 116 is transferred into the parallel-serial converter 120 through the gate 117, the second buffer 118A or 118B and the gate 119, and is converted into serial signals. The serial signals thus obtained are transmitted to the channel L through the decision box 121 and a transmission control unit 133.

The transmission speed may be arbitrarily selected, and transmission may be continued even when a brief erratic operation occurs. When writing on and reading from the buffer memory 116 are possible, they can be made at once under the control of the comparators 124 and 126.

Figure 9A:
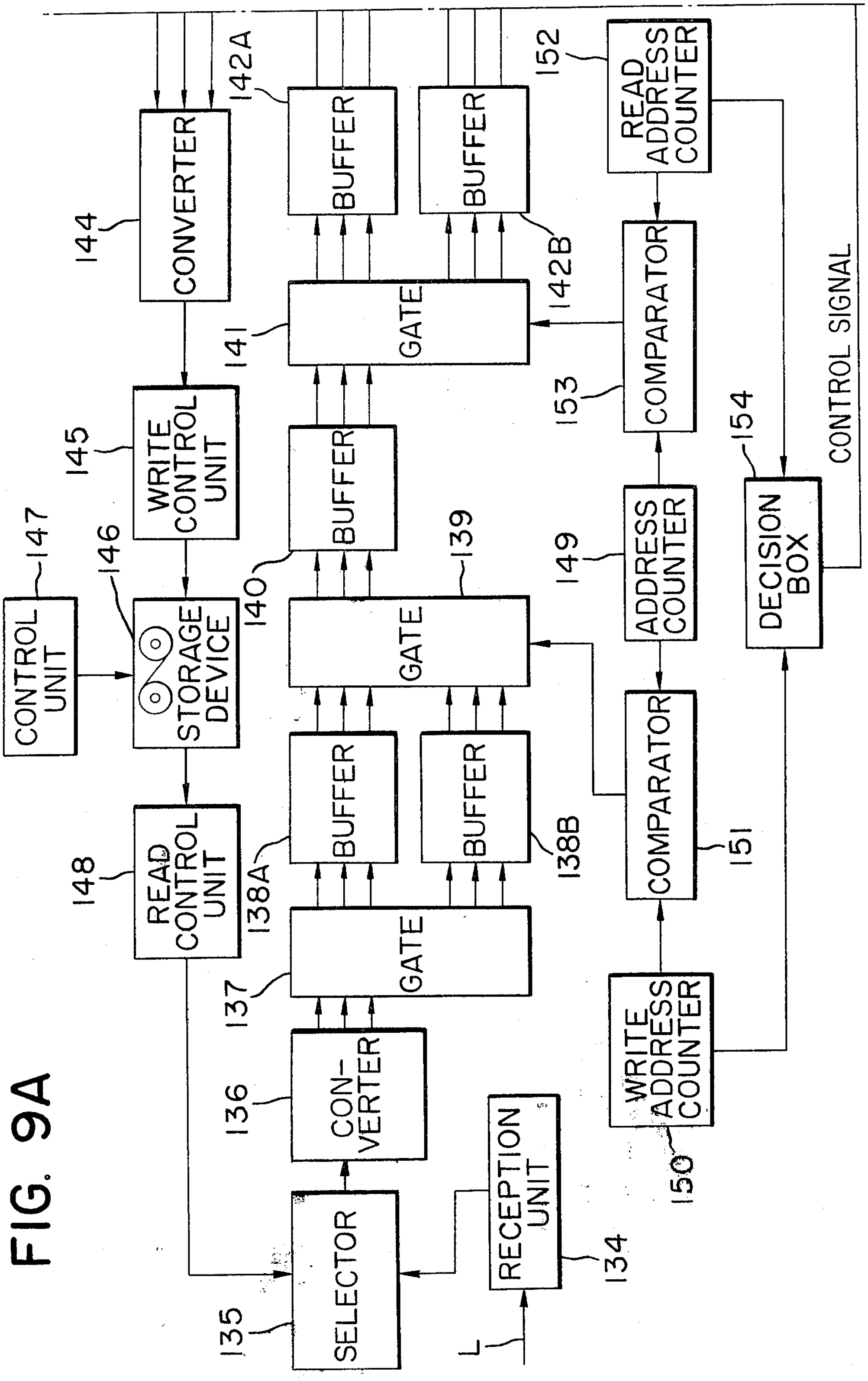
FIGS. 9A and 9B, is a detailed block diagram of a facsimile receiver thereof.
Figures 9, 9B:
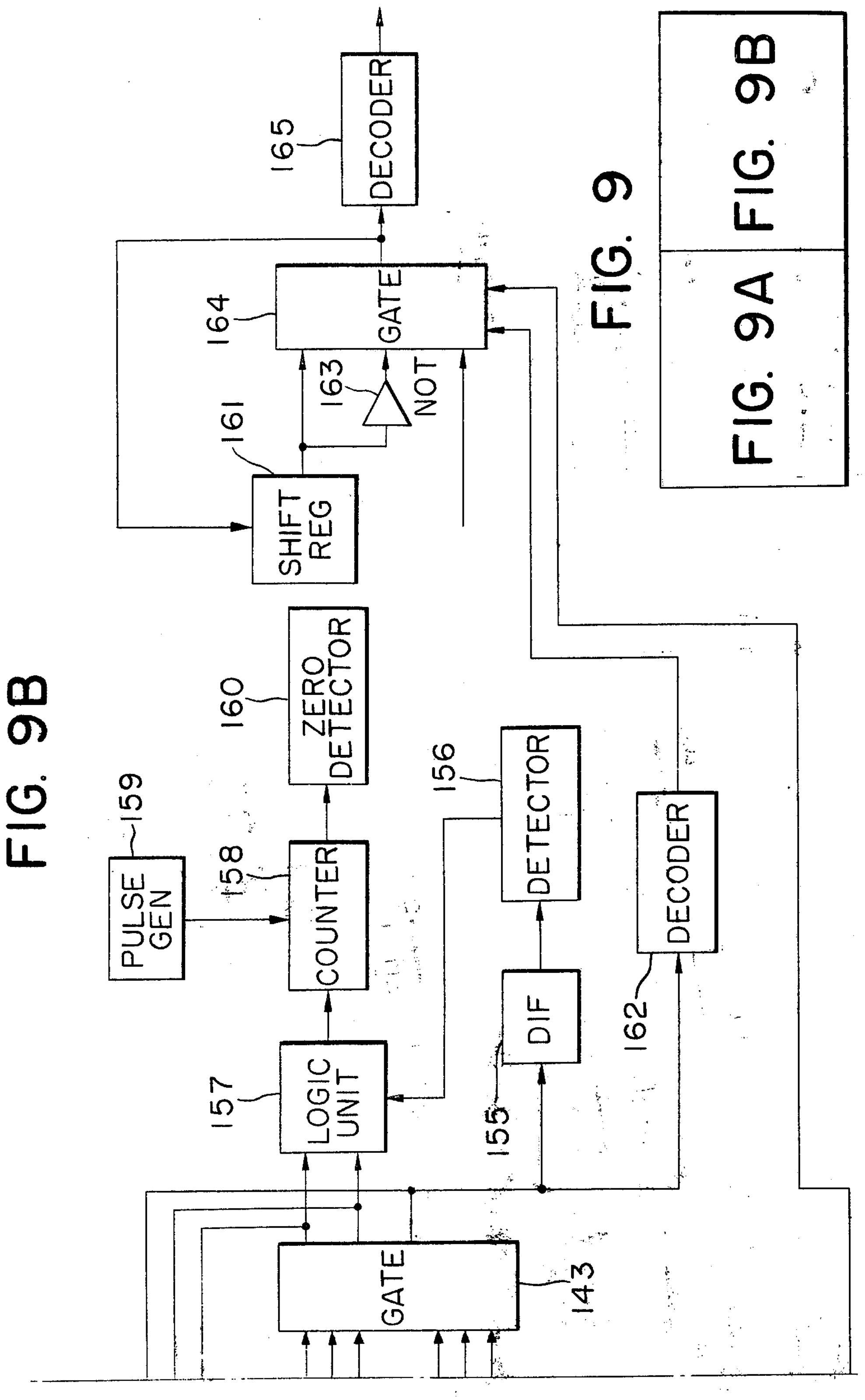
FIG. 9, including

Next referring to FIG. 9, the facsimile receiving equipment will be described in more detail hereinafter. The data transmitted through the channel L are received by a reception control unit 134 and fed into a selection circuit 135 whose output is converted into a 3-bit parallel signal by a serial-parallel converter 136. The parallel signal is transferred into a prestage or first buffer 138A or 138B through a gate circuit 137. As in the case of the transmission equipment the capacities of the first buffers 138A and 138B are so selected that the serial-parallel converter 136 is synchronous with a buffer memory 140. As a result data may be continuously received. The output of the first buffer 138A or 138B is transferred into the buffer memory 140 through a gate circuit 139, and the output of the buffer memory 140 is transferred into a second buffer 142A or 142B through a gate circuit 141. The output of the second buffer 142A or 142B is transferred into a parallel-serial converter 144 through a gate circuit 143, and the converted signals are stored in a magnetic tape storage device 146 under the control of a write control unit 145. When the data of one subject copy is stored, rewinding of the magnetic tape at a high speed is effected in response to a control signal from a control unit 147. Upon completion of the rewinding the data stored in the magnetic tape storage device 146 are transferred, in response to a control signal from a control unit 148, through the selector 135 into the serial-parallel converter 136 so that the read-out data are again converted into 3-bit parallel signals, which are transferred through the gate 143.

The buffer memory 140 is a dynamic register such as a delay line, and the address is monitored by a counter 149. A write address counter 150, a comparator 151 for comparating the contents of the counters 149 and 150, a read address counter 152 and a comparator 153 for comparing the contents of the counters 152 and 153 are similar to those of the facsimile transmitter so that no further description thereof will be made in this specification. A decision box 154 compares the contents of the counters 150 and 152 to detect the difference between the write address and the read address. When it is impossible to write data on the buffer memory 140, a control signal is generated from the decision box 154 so that reading the data from the magnetic tape storage device 146 is temporarily interrupted. When it becomes possible again to write on the buffer memory 140, a control signal is generated by the decision box 154 to resume reading the data from the magnetic tape storage device 146. The scanning of the facsimile output is is made continously, and output data are required at a rate depending upon the scanning speed. However in case the buffer memory 140 is empty, the decision box 154 gives a control signal to a gate circuit 164 so that a "repeat and compression" operation may be effected.

Of the 3-bit parallel signal, one bit representing the coincidence or non-coincidence is differentiated by a differentiation circuit 155 and applied to a code-change-point detector 156 so that the code change point of the coincidence and non-coincidence signals may be detected. The bit group consisting of 2 bits and representing the run-length is transferred into a counter 158 through a logic unit 157. The number of bit groups representing the run-length to be transferred into the counter 158 is determined in response to a control signal from a detector 156. That is, during the time interval from one code change point to the next change point the binary coded signals representing the run-length of coincidence or non-coincidence are stored into the counter 158. Then reading from the second buffer register 142A or 142B is temporarily interrupted, and the decoding into video signals is carried out in the manner described hereinafter.

Assume that the video signals of the old scanning line are stored in a shift register 161. The content of the counter 158 is subtracted sequentially in response to the timing pulses from a timing pulse generator 159, and reading from the shift register 161 is carried out in synchronism with the timing pulses until the content of the counter 158 becomes zero, as detected by a zero detector 160. To a code decision circuit 162 is applied the discrimination bit from the gate circuit 143. When the 0 discrimination bit is detected, the output of the shift register 161 is transferred to a recorder (not shown) through the gate circuit 164 and a decoder 165. When the 1 discrimination bit is detected, the output of the shift register 101 is reversed by a NOT circuit 163 and then transferred to the recorder through the gate circuit 164 and the decoder 165. When the content of the counter 158 becomes zero, the content of the buffer 142A or 142B is read out, and the discrimination code is applied to the differentiation circuit 155 whereas the bit group representing a run-length is applied to the counter 158. Whenever the code change point is detected by the detector 156, the above operations are cycled. The output of the gate circuit 164 is returned to the shift register 161 and used as the signals of the old scanning line. The 0 input to the gate circuit 164 is for reproducing white elementary areas of the first scanning line.

When the buffer memory 140 is empty, a control signal is applied from the decision box 154 to the gate circuit 164. Then the gate circuit 164 is so actuated as to transfer the output of the shift register 161 to the decoder 165 regardless of the output signal of the code decision circuit 162. When the reproduction of the subject copy is accomplished in the manner described above, the control unit 147 gives a control signal to the magnetic tape storage device 146 so that the tape is rewound at high speed to prepare for storage of the data of a next subject copy.

So far the transmission and reproduction of one subject copy has been described, but when control signals are repetitively given from the control unit 147, the data in the storage 146 may be reproduced many times so that many copies may be obtained. Furthermore when a plurality of receiving stations are set into the control unit 130 in the transmission equipment, data may be continously transmitted to the receiving stations only by one scanning of a subject copy.

It is to be understood that variations and modifications can be effected. For example in the transmission equipment, buffer memories may be interposed between the scanner and the magnetic tape storage device and between the magnetic tape storage device and the transmission line. The same is true for the receiving equipment. Furthermore in order to prevent the overflow of the buffer memories of the transmission and receiving equipments, the output of a scanning line may be suppressed or interrupted instead of the above described repeat and compression.

What is claimed is:

1. A facsimile system including a facsimile transmitter having transmitting means and comprising:

means scanning a subject copy in a succession of scanlines and deriving a corresponding succession of video signals;

encoding means combining successive video signals and deriving an encoded digital signal whose rate varies with the degree of difference between the successive combined scanlines;

transmitter storage means for retrievably storing a digital signal applied thereto;

transmitter buffer memory means for storing an input digital signal applied thereto and providing an output signal whose bit sequence is the same as that of the input signal but whose rate is substantially independent of that of the input signal;

means applying the encoded digital signal to the transmitter buffer memory means and applying the output signal of the transmitter buffer memory means to the transmitter storage means;

means subsequently retrieving the encoded signal from the transmitter storage means and applying the retrieved encoded signal to the transmitter buffer memory means and applying the output signal of the transmitter buffer memory means to the transmitting means;

means operable when the encoded signal is being applied to the transmitter buffer memory means and generating a first control signal when more than a predetermined amount of said encoded signal is present in the transmitter buffer memory means; and means operative in response to the first control signal and decreasing the rate of the encoded signal applied to the transmitter buffer memory means by causing the encoding means to derive an encoded signal corresponding to combining at least one video signal with itself rather than with another video signal;

whereby the rate of the encoded signal provided by the encoding means can be selectively decreased to prevent overflow of the transmitter buffer memory means by, in effect, disregarding the information content of at least one scanline, and whereby the scanning rate can be maintained at a selected steady level independent of the operation of the remainder of the transmitter and independent of the information content of the scanned subject copy.

2. A system as in claim 1 wherein the transmitter buffer memory means has a defined number of storage locations and wherein the means for generating the first control signal detect the total number of storage locations currently occupied by the encoded signal.

3. A system as in claim 1 wherein the encoding means comprises means for delta-coding the video signals by comparing successive video signals with each other and for run-length coding of the resulting delta signal to provide said encoded signal, and wherein the means for decreasing the rate of the encoded signal comprises means for causing the encoding means to compare a selected video signal with itself in the course of delta-coding.

4. A system as in claim 1 including a facsimile receiver comprising:

receiver storage means for retrievably storing a digital signal applied thereto;

receiver buffer memory means for storing an input digital signal applied thereto and providing an output signal whose bit sequence is the same as that of the input signal but whose rate is substantially independent of that of the input signal;

means for decoding an encoded signal applied thereto into the corresponding video signals;

means receiving the signal from the transmitting means and applying the received signal to the receiver buffer memory means and applying the output signal of the receiver buffer memory means to the receiver storage means; and means subsequently retrieving the encoded signal from the receiver storage means and applying the retrieved encoded signal to the receiver buffer memory means and applying the output signal of the receiver buffer memory means to the decoding means.

5. A system as in claim 4 including:

means operable while the encoded signal is being applied from the receiver storage means to the receiver buffer memory means and generating a second control signal when more than a predetermined amount of the encoded signal is present in the receiver buffer memory means; and means operative in response to said second control signal and causing an interruption in the applying of said encoded signal from the receiver storage means to the receiver buffer memory means.

6. A system as in claim 5 including:

means operable while the encoded signal from the receiver buffer memory means is being applied to the decoding means and generating a third control signal when less than a predetermined amount of the encoded signal is present in the receiver buffer memory means; and means operative in response to the third control signal to cause the decoding means to repeat the last video signal provided thereby.

7. A facsimile system including a facsimile receiver comprising:

means for receiving an encoded signal resulting from scanning a subject copy in a succession of scanlines, deriving a corresponding succession of video signals and encoding the successive video signals into an encoded digital signal whose rate varies with the degree of difference between successive scanlines; receiver storage means for retrievably storing a digital signal applied thereto;

receiver buffer memory means for storing an input digital signal applied thereto and providing an output signal whose bit sequence is the same as that of the input signal but whose rate is substantially independent of that of the input signal;

means for decoding an encoded signal applied thereto into the corresponding video signals;

means applying the received encoded digital signal to the receiver buffer memory means and applying the output signal of the receiver buffer memory means to the receiver storage means;

means subsequently retrieving the encoded signal from the receiver storage means and applying the retrieved encoded signal to the receiver buffer memory means and applying the output signal of the receiver buffer memory means to the decoding means; and means operable while the encoded signal is being applied from the receiver storage means to the receiver buffer memory means and generating a control signal when more than a predetermined amount of the encoded signal is present in the receiver buffer memory means; and means operative in response to said control signal and causing an interruption in the applying of the encoded signal from the receiver storage means to the receiver buffer memory means.

8. A system as in claim 7 including:

means operable when the encoded signal is being applied from the receiver buffer memory means to the decoding means and generating another control signal when less than a predetermined amount of the encoded signal is present in the receiver buffer memory means; and means operative in response to said another control signal to cause the decoding means to repeat the last video signal provided thereby.

9. A facsimile system comprising:

a facsimile transmitter including:

means for scanning a subject copy to derive original video signals;

means for deriving delta signals by comparing bit-by-bit the original video signals of one scanning line with those of the preceding scanning line;

means for coding and compressing said delta signals to provide a flow of coded and compressed signals;

transmitter storage means for temporarily storing said coded and compressed signals;

transmitter buffer memory means for controlling the flow of said coded and compressed signals to and from said transmitter storage means;

means for writing in said transmitter storage means said coded and compressed signals through said transmitter buffer memory means; and means for sequentially reading from said transmitter storage means said coded and compressed signals for transmission thereof through said transmitter buffer memory means to a transmission channel; and a facsimile receiver including:

means for receiving said coded and compressed signals transmitted through said transmission channel;

receiver storage means for temporarily storing said received coded and compressed signals;

receiver buffer memory means for controlling the flow of said received coded and compressed signals to and from said receiver storage means;

decoding means for converting said received coded and compressed signals into the original video signals;

means for sequentially writing in said receiver storage means through said receiver buffer memory means said received coded and compressed signals; and means for reading said coded and compressed signals from said receiver storage means and sequentially transmitting said coded and compressed signals to said decoding means through said receiver buffer memory means;

and further including:

monitor means for monitoring the quantity of data stored in the transmitter buffer memory means to generate a control signal when said quantity of data reaches a predetermined level; and means responsive to said control signal for causing the means for deriving delta signals to compare the original video signals of the preceding scanning line with themselves rather than with those of the one scanning line.

10. A facsimile system as in claim 9 including:

means for detecting when the quantity of data stored in the receiver buffer memory means is less than a predetermined quantity to generate another control signal; and means for causing the decoding means to repeat the previous decoded original video signal in response to said another control signal.

11. A facsimile system as in claim 9 where said storage means in both the facsimile transmitter and the facsimile receiver are magnetic tape storage devices.

* * * * *